United States Patent
Yonezawa

(10) Patent No.: US 9,069,507 B2
(45) Date of Patent: Jun. 30, 2015

(54) PRINT SERVER, PRINTING SYSTEM, AND COMPUTER PROGRAM PRODUCT CONFIGURED TO SEND PRINT DATA TO AN IMAGE FORMING APPARATUS BASED ON OBTAINED DESIGNATION OF THE IMAGE FORMING APPARATUS

(71) Applicant: Hozumi Yonezawa, Tokyo (JP)

(72) Inventor: Hozumi Yonezawa, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 13/919,263

(22) Filed: Jun. 17, 2013

(65) Prior Publication Data

US 2014/0009775 A1  Jan. 9, 2014

(30) Foreign Application Priority Data

Jul. 5, 2012 (JP) ................. 2012-150988

(51) Int. Cl.
*G06F 3/12* (2006.01)

(52) U.S. Cl.
CPC .............. *G06F 3/126* (2013.01); *G06F 3/1211* (2013.01); *G06F 3/1247* (2013.01); *G06F 3/1288* (2013.01)

(58) Field of Classification Search
USPC .................................. 358/1.1–3.29
See application file for complete search history.

(56) References Cited

U.S. PATENT DOCUMENTS

2010/0201996 A1* 8/2010 Chang et al. ................... 358/1.2
2011/0299114 A1* 12/2011 Nishimaki ................... 358/1.15

FOREIGN PATENT DOCUMENTS

| JP | 2001-125759 | 5/2001 |
| JP | 2011-257799 | 12/2011 |

* cited by examiner

*Primary Examiner* — Marcellus Augustin
(74) *Attorney, Agent, or Firm* — Harness, Dickey & Pierce, P.L.C.

(57) ABSTRACT

According to an embodiment, a print server connected to a plurality of image forming apparatuses via a network includes: a print-command acquisition unit that acquires a print command containing designation of one of the image forming apparatuses as a printing-assigned apparatus and designation of to-be-printed data; a determining unit that determines whether or not the printing-assigned apparatus is a speed-oriented apparatus; a raster image processing unit that, when the printing-assigned apparatus is not the speed-oriented apparatus, obtains rasterized data by performing raster image processing on the to-be-printed data written in a page description language; and a transmitting unit that, when the printing-assigned apparatus is not the speed-oriented apparatus, transmits the rasterized data to the printing-assigned apparatus, but when the printing-assigned apparatus is the speed-oriented apparatus, transmits the to-be-printed data to the printing-assigned apparatus.

6 Claims, 6 Drawing Sheets

111

| PRINTER ID | RASTERIZATION PREFERENCE | |
|:---:|:---:|:---:|
| | SPEED-ORIENTED | OUTPUT-ORIENTED |
| A01 | ON | OFF |
| A02 | ON | OFF |
| B01 | OFF | ON |
| C01 | OFF | OFF |
| ⋮ | ⋮ | ⋮ |

FIG.3

| PRINTER ID | RASTERIZATION PREFERENCE | |
| --- | --- | --- |
| | SPEED-ORIENTED | OUTPUT-ORIENTED |
| A01 | ON | OFF |
| A02 | ON | OFF |
| B01 | OFF | ON |
| C01 | OFF | OFF |
| ⋮ | ⋮ | ⋮ |

PRINT SERVER, PRINTING SYSTEM, AND COMPUTER PROGRAM PRODUCT CONFIGURED TO SEND PRINT DATA TO AN IMAGE FORMING APPARATUS BASED ON OBTAINED DESIGNATION OF THE IMAGE FORMING APPARATUS

CROSS-REFERENCE TO RELATED APPLICATIONS

The present application claims priority to and incorporates by reference the entire contents of Japanese Patent Application No. 2012-150988 filed in Japan on Jul. 5, 2012.

BACKGROUND OF THE INVENTION

1. Field of the Invention

The present invention generally relates to a print server, a printing system, and a computer program product.

2. Description of the Related Art

Some types of conventional image forming apparatuses rasterize to-be-printed data, which is written in a page description language (PDL), and perform raster-data-based printing.

A printing system including a print server and an image forming apparatus is also known. There is also known a technique related to such a printing system, according to which a print server rasterizes PDL data to obtain raster data, and transmits the raster data to an image forming apparatus.

For example, Japanese Patent Application Laid-open No. 2011-257799 discloses a technique for a system including a print server and an image forming apparatus. According to this technique, a task of performing raster image processing is selectively assigned to one of the print server and the image forming apparatus so as to reduce time until completion of image printing by the image forming apparatus.

However, printers (image forming apparatuses), particularly wide-format printers for forming an image on a wide-format (large-format) recording medium, generally form an image from data of various file formats, such as a file format for drawings. Accordingly, a situation that an image forming apparatus cannot perform printing because the apparatus lacks capability of processing to-be-printed data has occurred in some cases depending on a file format of the to-be-printed data and/or specifications of the printer.

In view of the problem described above, there are needs for a print server, a printing system, and a computer program product capable of performing printing reliably.

SUMMARY OF THE INVENTION

It is an object of the present invention to at least partially solve the problems in the conventional technology.

According to the present invention, there is provided: a print server connected to a plurality of image forming apparatuses via a network, the print server comprising: a print-command acquisition unit configured to acquire a print command containing designation of one of the image forming apparatuses as a printing-assigned apparatus, to which printing is assigned, and designation of to-be-printed data; a determining unit configured to determine whether or not the printing-assigned apparatus is defined in advance as a speed-oriented apparatus, the speed-oriented apparatus being an image forming apparatus that is to put a high priority on processing speed; a raster image processing unit configured to, when the printing-assigned apparatus is not the speed-oriented apparatus, obtain rasterized data by performing raster image processing on the to-be-printed data designated in the print command and written in a page description language; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data.

The present invention also provides a printing system including a plurality of image forming apparatuses and a print server connected to the plurality of image forming apparatuses via a network, the printing system comprising: a print-command acquisition unit configured to acquire a print command containing designation of one of the image forming apparatuses as a printing-assigned apparatus, to which printing is assigned, and designation of to-be-printed data; a determining unit configured to determine whether or not the printing-assigned apparatus is defined in advance as a speed-oriented apparatus, the speed-oriented apparatus being an image forming apparatus that is to put a high priority on processing speed; a raster image processing unit configured to, when the printing-assigned apparatus is not the speed-oriented apparatus, obtain rasterized data by performing raster image processing on the to-be-printed data designated in the print command and written in a page description language; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data.

The present invention also provides a print processing method to be performed by a print server connected to a plurality of image forming apparatuses via a network, the print processing method comprising: acquiring a print command containing designation of one of the image forming apparatuses as a printing-assigned apparatus, to which printing is assigned, and designation of to-be-printed data; determining whether or not the printing-assigned apparatus is defined in advance as a speed-oriented apparatus, the speed-oriented apparatus being an image forming apparatus that is to put a high priority on processing speed; performing raster image processing on the to-be-printed data designated in the print command and written in a page description language to obtain rasterized data when the printing-assigned apparatus is not the speed-oriented apparatus; and transmitting any one of the rasterized data and the to-be-printed data in such a manner that, when the printing-assigned apparatus is not the speed-oriented apparatus, transmitting the rasterized data, and when the printing-assigned apparatus is the speed-oriented apparatus, transmitting the to-be-printed data.

The present invention also provides a computer program product comprising a non-transitory computer-readable medium that contains a computer program having instructions that, when executed by a computer connected to a plurality of image forming apparatuses via a network and including a storage unit that stores a speed-oriented apparatus that is to put a high priority on processing speed, cause the computer to function as: a print-command acquisition unit configured to acquire a print command containing designation of one of the image forming apparatuses as a printing-assigned apparatus, to which printing is assigned, and designation of to-be-printed data; a determining unit configured to determine whether or not the printing-assigned apparatus is defined in advance as the speed-oriented apparatus; a raster image processing unit configured to, when the printing-assigned apparatus is not the speed-oriented apparatus, obtain rasterized data by performing raster image processing on the to-be-printed data designated in the print command and written in a page description language; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram schematically illustrating a data structure of a printer table;

DETAILED DESCRIPTION OF THE PREFERRED EMBODIMENTS

Figure 1:
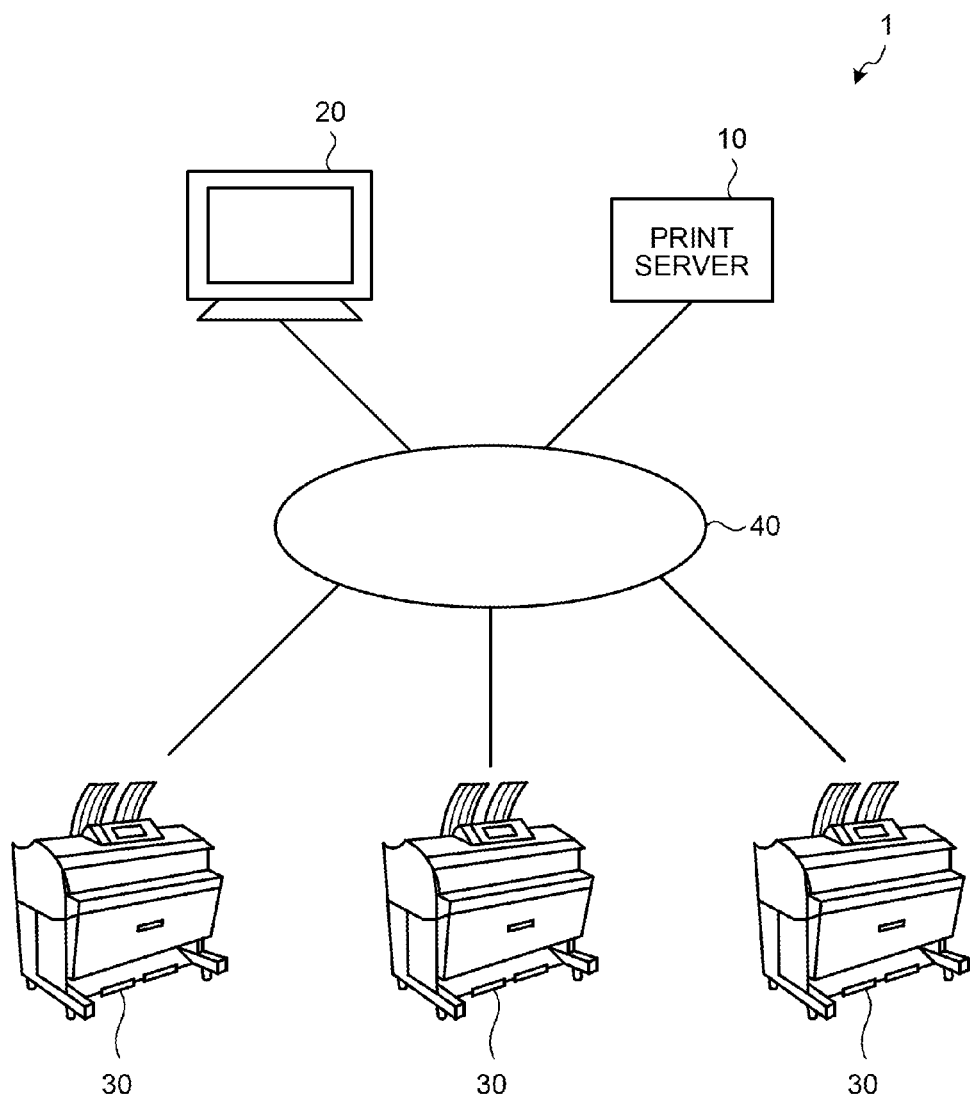
FIG. 1 is a block diagram illustrating an overall configuration of a printing system.

Exemplary embodiments of a print server, a printing system, a print processing method, and a computer program product are described in detail below with reference to the accompanying drawings. FIG. 1 is a block diagram illustrating an overall configuration of a printing system 1 according to an embodiment. The printing system 1 includes a print server 10, a personal computer (PC) 20, which is an example of a client machine, and a plurality of printers 30. The print server 10, the PC 20, and the plurality of printers 30 can carry out communications over a network 40.

The PC 20 transmits to-be-printed data, which is data to be printed, to the print server 10. The print server 10 performs raster image processing on the to-be-printed data to obtain rasterized data. The raster image processing is a process of rasterizing to-be-printed data to obtain raster data, which is rasterized data. The print server 10 transmits any one of the to-be-printed data and the rasterized data to a specified one of the printers 30.

When the printer 30 receives rasterized data, the printer 30 forms an image from the rasterized data, whereas when the printer 30 receives the to-be-printed data, the printer 30 performs raster image processing to obtain rasterized data, and thereafter forms an image from the rasterized data. The printer 30 can be a copier or an multifunction peripheral (MFP) having at least two functions of a copier function, a printer function, a scanner function, and a facsimile function. More preferably, the printer 30 is a wide-format copier or a wide-format MFP.

Thus, in the printing system 1 according to the present embodiment, an apparatus that performs raster image processing is selectable between the print server 10 and the printer 30. Accordingly, it is unnecessary for the printers 30 of the printing system 1 to be capable of raster image processing.

Figure 2:
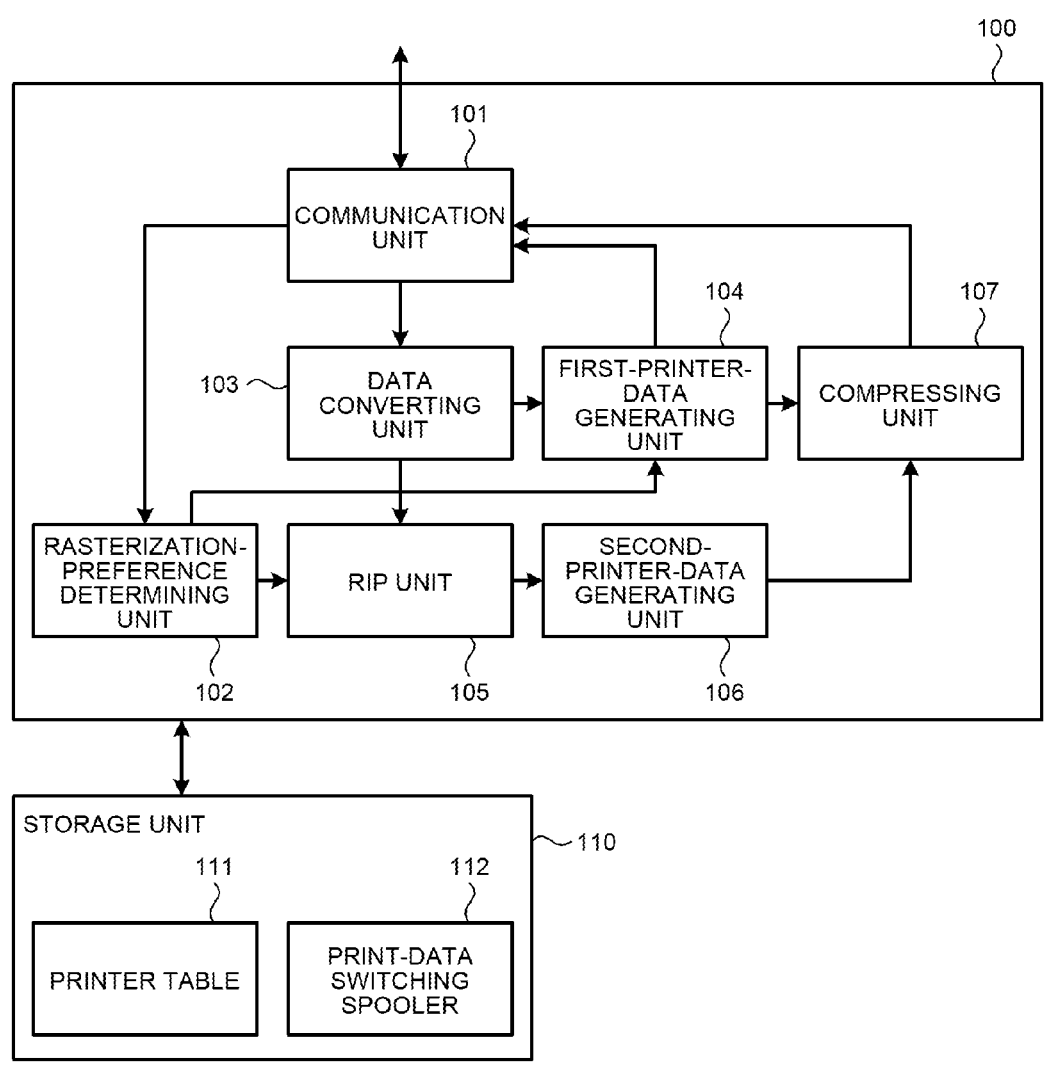
FIG. 2 is a block diagram illustrating a functional configuration of a processing unit and a storage unit of a print server.

FIG. 2 is a block diagram illustrating a functional configuration of a processing unit 100 and a storage unit 110 of the print server 10. The processing unit 100 includes a communication unit 101, a rasterization-preference determining unit 102, a data converting unit 103, a first-printer-data generating unit 104, a raster image processor (RIP) unit 105, a second-printer-data generating unit 106, and a compressing unit 107. The storage unit 110 includes a printer table 111 and a print-data switching spooler 112.

The printer table 111 of the storage unit 110 stores printer IDs, which are for identification of the printers 30 connected to the network 40, and rasterization preferences associated with each other. FIG. 3 is a diagram schematically illustrating a data structure of the printer table 111.

The rasterization preference is information to be consulted to determine to which one of the print server 10 and the printer 30 raster image processing is to be assigned. The rasterization preference in the present embodiment includes two rasterization preferences, which are speed-oriented and output-oriented, as illustrated in FIG. 3. The speed-oriented rasterization preference indicates that raster image processing should be assigned to the printer 30. On the other hand, the output-oriented rasterization preference indicates that raster image processing should be assigned to the print server 10.

It is assumed that rasterization preference that depends on specifications or the like of each of the printers 30 is listed in the printer table 111 in advance by a designer or the like for each of the printers 30. For instance, when processing speed of one of the printers 30 is fast and it is desired to perform speed-oriented printing, the speed-oriented rasterization preference associated with a printer ID of the one of the printers 30 is set to ON. On the other hand, when processing speed of one of the printers 30 is slow or when a high priority is placed on reliably obtaining a printout, the output-oriented rasterization preference associated with a printer ID of the one of the printers 30 is set to ON.

The print-data switching spooler 112 of the storage unit 110 holds various data to be handled by the print server 10. The print-data switching spooler 112 will be described later.

The communication unit 101 exchanges various information with the PC 20 and the printers 30 over the network 40. The communication unit 101 receives print command data from the printer 30, for example. The print command data contains not only a print command but also designation of one of the printers 30 that is to perform printing, printing preferences about duplex printing/single-sided, whether stapling is to be performed, and the like, and to-be-printed data that is to be printed. The one of the printers 30 designated in the print command data as the printer 30 that is to perform printing is referred to as the printing-assigned printer 30 as appropriate below.

The communication unit 101 also transmits either to-be-printed data or rasterized data obtained by performing raster image processing on the to-be-printed data to the printing-assigned printer 30 over the network 40.

The rasterization-preference determining unit 102 determines a rasterization preference of the printing-assigned printer 30 by consulting the printer table 111 of the storage unit 110. When the rasterization preference of the printing-assigned printer 30 is specified to be speed-oriented, the rasterization-preference determining unit 102 determines that the printing-assigned printer 30 should perform raster image processing. Meanwhile, when the speed-oriented rasterization preference of the printing-assigned printer 30 is set to ON, the rasterization-preference determining unit 102 determines that the printing-assigned printer 30 should perform raster image processing irrespective of whether or not the output-printed rasterization preference is set to ON.

Each of the printers 30 identified by a printer ID that is associated with the speed-oriented rasterization preference in the printer table 111 is a speed-oriented printer. In other words, the printer table 111 stores information of speed-oriented printers. When the printing-assigned printer 30 is stored as a speed-oriented printer in the printer table 111, the rasterization-preference determining unit 102 determines that the printing-assigned printer 30 should perform raster image processing.

As described above, when the printing-assigned printer 30 is a speed-oriented printer, raster image processing is to be performed by the printing-assigned printer 30 so that time required until completion of printing can be reduced.

When the rasterization preference of the printing-assigned printer 30 is specified to be output-oriented, the rasterization-preference determining unit 102 determines that the print server 10 should perform raster image processing. The rasterization-preference determining unit 102 also determines that the print server 10 should perform raster image processing in each of a case where both the speed-oriented and output-oriented rasterization preferences of the printing-assigned printer 30 are set to OFF as in the case of the printer 30 of which printer ID is "C01" illustrated in FIG. 3 and a case where the printer ID of the printing-assigned printer 30 is not listed in the printer table 111.

Meanwhile, neither of the printer 30 that is listed in the printer table 111 but not associated with the speed-oriented rasterization preference, and the printer 30 that is not listed in the printer table 111 is a speed-oriented printer. When the printing-assigned printer 30 is not a speed-oriented printer or, more specifically, the printing-assigned printer 30 is not stored as a speed-oriented printer in the printer table 111, the rasterization-preference determining unit 102 determines that the print server 10 should perform raster image processing.

As described above, raster image processing that places a heavy processing load is to be performed by the print server 10 so that to-be-printed data is reliably printed when any one of the following criteria is met: a high priority is placed on ensuring that the printer 30 produces a printout; and whether or not the printer 30 can produce a printout of the to-be-printed data cannot be determined because a rasterization preference of the printer 30 is not listed in the printer table 111.

Furthermore, when the printing-assigned printer 30 is not listed in the printer table 111, the rasterization-preference determining unit 102 determines that a compression process is not to be performed on transmission data, which is to be transmitted to the printing-assigned printer 30. When the printing-assigned printer 30 is listed in the printer table 111, the rasterization-preference determining unit 102 determines that the compression process is to be performed on the transmission data, which is to be transmitted to the printing-assigned printer 30. This is because, when the printer 30 is not listed in the printer table 111, whether or not the printer 30 has a function of decompressing compressed data cannot be determined.

Note that the above process of determining that the compression process should be performed on data to be transmitted to the printer 30 listed in the printer table 111 is based on a premise that the printer 30 listed in the printer table 111 is capable of the compression process. In other words, the printers 30 listed in the printer table 111 are capable of decompression, and printers capable of decompression are stored in the printer table 111.

When the printer ID of the printing-assigned printer 30 is stored in the printer table 111, the rasterization-preference determining unit 102 determines that the compression process is to be performed irrespective of the rasterization preference. Meanwhile, when a printer ID of the printing-assigned printer 30 is not stored in the printer table 111, the printing-assigned printer 30 is incapable of decompression. Accordingly, in this case, the rasterization-preference determining unit 102 determines that the compression process is not to be performed.

There can be a situation where, even though the printer 30 is listed in the printer table 111, the printer 30 does not have a decompression function. For such a situation, the printer table 111 may additionally contain information about whether or not each of the printers 30 has a decompression function. When this configuration is employed, the rasterization-preference determining unit 102 may be configured to determine whether or not to perform the compression process on data to be transmitted by consulting the printer table 111.

The data converting unit 103 converts a file format of the to-be-printed data designated in the print command to a file format that can be processed by the print server 10. Specifically, the data converting unit 103 converts the to-be-printed data into page description language (PDL) data. In the present embodiment, the data converting unit 103 converts the to-be-printed data into PostScript (registered trademark) (PS) data. Example file formats of to-be-printed data to be input to the data converting unit 103 via the communication unit 101 include Hewlett-Packard Graphics Language (HPGL) (registered trademark), Tagged Image File Format (TIFF) (registered trademark), Calcomp (registered trademark), Joint Photographic Experts Group (JPEG), and DWG (registered trademark). The data converting unit 103 performs data conversion using a conversion filter appropriate for a file format of the input data.

The first-printer-data generating unit 104 generates first printer data by adding printing preferences to the PS data obtained by the data converting unit 103.

The RIP unit 105 obtains rasterized data by performing raster image processing on the PS data generated by the data converting unit 103. Specifically, the RIP unit 105 rasterizes the PS data obtained from the to-be-printed data, thereby generating raster data as rasterized data. The RIP unit 105 thus serves as a raster image processing unit.

The second-printer-data generating unit 106 generates second printer data by adding printing preferences to the rasterized data generated by the RIP unit 105.

Each of the first-printer-data generating unit 104 and the second-printer-data generating unit 106 converts the first printer data and the second printer data, respectively, into a file format that can be processed by the printing-assigned printer 30.

The compressing unit 107 performs the compression process on the first printer data generated by the first-printer-data generating unit 104 and the second printer data generated by the second-printer-data generating unit 106. When the PS data contained in the first printer data is multi-valued data, the compressing unit 107 performs reversible compression for multi-level values, whereas when the PS data is binary data, the compressing unit 107 performs reversible compression for binary values. When the raster data contained in the second printer data is multi-valued data, the compressing unit 107 performs reversible compression for multi-level values, whereas when the raster data is binary data, the compressing unit 107 performs reversible compression for binary values. Thus, by performing the decompression process, the printer 30 can obtain multi-valued data from compressed multi-valued data, or binary data from compressed binary data.

The communication unit 101 transmits the compressed first printer data and the compressed second printer data to the printing-assigned printer 30. When the rasterization-preference determining unit 102 has determined that the compression process is not to be performed, the communication unit 101 transmits the first printer data that is not compressed to the printing-assigned printer 30.

Figure 4:
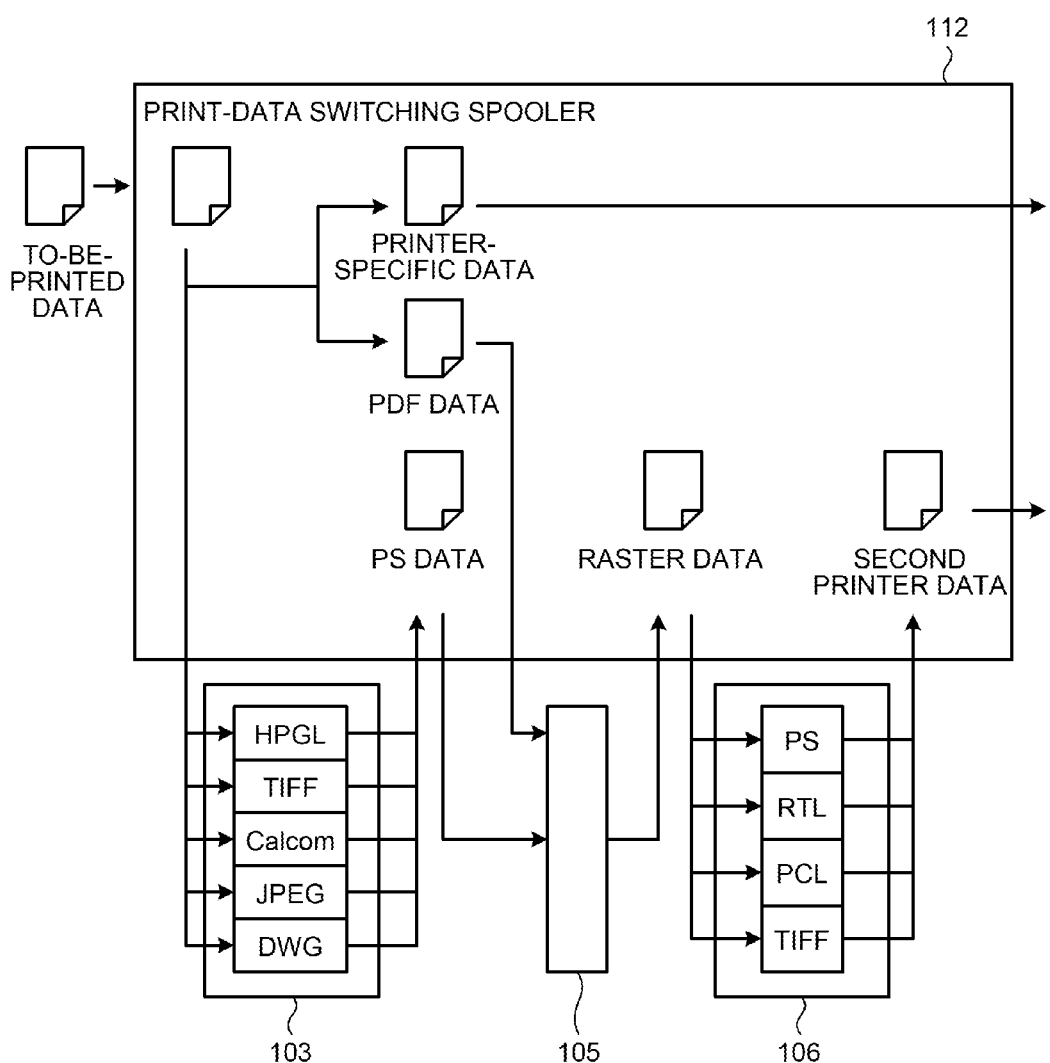
FIG. 4 is a diagram illustrating data spooled onto a print-data switching spooler.

FIG. 4 is a diagram illustrating data spooled onto the print-data switching spooler 112. To-be-printed data transmitted from the PC 20 is input to the print-data switching spooler 112. The to-be-printed data is converted by the data converting unit 103 into PS data using a conversion filter appropriate for a file format of the to-be-printed data, and input to the print-data switching spooler 112.

The PS data is converted by the RIP unit 105 into raster data. This raster data is input to the print-data switching spooler 112. When the to-be-printed data is portable document format (PDF) data, the data converting unit 103 does not perform data conversion of the to-be-printed data. Instead, the RIP unit 105 reads out this PDF data and converts it into raster data. When the to-be-printed data is printer-specific data supported by at least one of the printers 30, data conversion is not performed; instead, the printer-specific data is directly transmitted to the printer 30.

The raster data is then read out by the second-printer-data generating unit 106. The second-printer-data generating unit 106 generates second printer data of a format supported by the destination printer 30. The second printer data is input to the print-data switching spooler 112.

Figure 5:
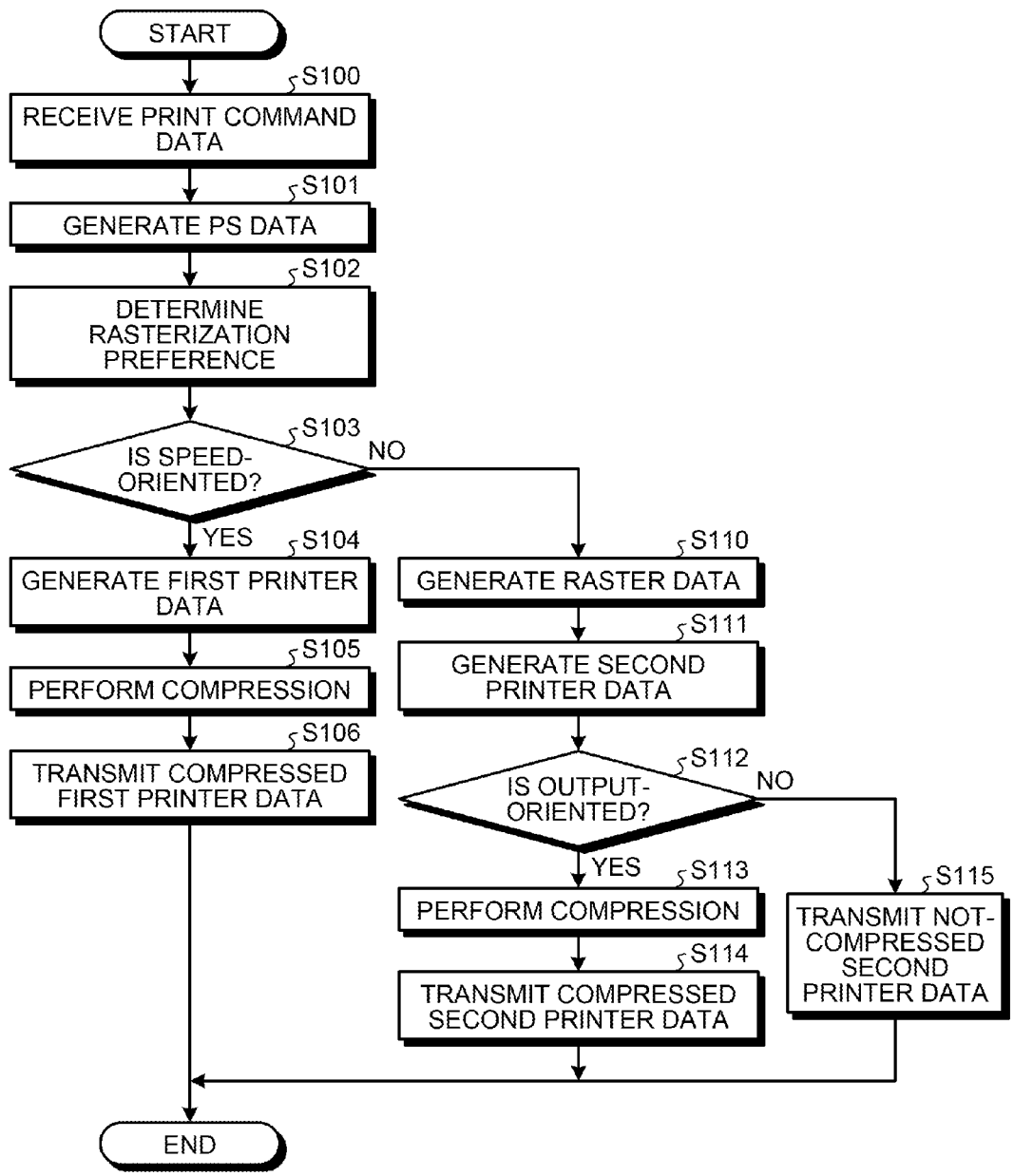
FIG. 5 is a flowchart illustrating a print-data managing process.

FIG. 5 is a flowchart illustrating a print-data managing process to be performed by the print server 10. When the communication unit 101 receives print command data (Step S100), the data converting unit 103 converts to-be-printed data contained in the print command data into PS data. In short, the data converting unit 103 generates the PS data (Step S101). The rasterization-preference determining unit 102 consults the printer table 111 about the printing-assigned printer 30, which is designated in the print command data, to specify a rasterization preference of the to-be-printed data and whether or not the to-be-printed data is to be compressed (Step S102).

When the rasterization preference of the to-be-printed data is specified to be speed-oriented or, in other words, it is determined that the printing-assigned printer 30 should perform raster image processing (Yes at Step S103), the first-printer-data generating unit 104 generates first printer data by adding printing preferences to the PS data (Step S104). Subsequently, the compressing unit 107 compresses the first printer data (Step S105). The communication unit 101 then transmits the compressed first printer data to the printing-assigned printer 30 (Step S106).

On receiving the first printer data, the printing-assigned printer 30 decompresses the first printer data to obtain the PS data, and generates raster data by rasterizing the PS data. The printing-assigned printer 30 forms an image based on the raster data.

When the rasterization preference of the to-be-printed data is not specified to be speed-oriented at Step S103 or, in other words, it is determined that the print server 10 should perform raster image processing (No at Step S103), the RIP unit 105 generates raster data by rasterizing the PS data (Step S110). Subsequently, the second-printer-data generating unit 106 generates second printer data by adding printing preferences to the raster data (Step S111).

When the rasterization preference of the to-be-printed data is specified to be output-oriented (Yes at Step S112), the rasterization-preference determining unit 102 determines that the compression process is to be performed. Accordingly, the compressing unit 107 compresses the second printer data (Step S113). Subsequently, the communication unit 101 transmits the compressed second printer data to the printing-assigned printer 30 (Step S114). On receiving the second printer data, the printing-assigned printer 30 decompresses the second printer data to obtain the raster data, and forms an image from the raster data.

When the rasterization preference of the to-be-printed data is not specified to be output-oriented at Step S112 or, in other words, either when the rasterization preference of the printing-assigned printer 30 is not listed or when the printing-assigned printer 30 is not listed in the printer table 111 (No at Step S112), the rasterization-preference determining unit 102 determines that the compression process is not to be performed. Accordingly, the compression process is not performed, and the not-compressed second printer data is transmitted to the printing-assigned printer 30 (Step S115). On receiving the second printer data, the printing-assigned printer 30 forms an image based on the raster data. The print-data managing process performed by the print server 10 is thus completed.

As described above, in the printing system 1 according to the present embodiment, when a printout is to be produced by a printer that is not listed in the printer table 111 or a printer associated with the output-oriented rasterization preference, the print server 10 performs raster image processing to obtain raster data, and transmits the raster data to the printer as rasterized data. Accordingly, occurrence of an undesirable situation that a printer cannot produce a printout of to-be-printed data because the printer is incapable of perform raster image processing is prevented, thereby making it possible to reliably produce a printout of the to-be-printed data.

Furthermore, in the printing system 1 according to the present embodiment, printers capable of performing raster image processing, particularly among them, printers capable of performing raster image processing at high speeds, are listed as being associated with speed-oriented rasterization preference in the printer table 111. Accordingly, it is possible to cause the printer 30 associated with the speed-oriented rasterization preference to perform raster image processing, thereby completing printing of to-be-printed data in a relatively short period of time.

Although the embodiment of the present invention has been described above, the embodiment can be changed or modified in various ways.

In the present embodiment, the printing system 1 that includes the print server 10, the PC 20, and the printers 30 selects either the print server 10 or the printer 30 as an apparatus that should perform raster image processing as appropriate. The embodiment may be modified in such a manner that, for instance, in a situation where print command data is directly transmitted from a PC to a printer, either the PC or the printer is selected as an apparatus that should perform raster image processing as appropriate. To implement this modification, the PC will include the processing unit 100 and the storage unit 110 of the print server 10 illustrated in FIG. 2, and perform the print-data managing process of Step S101 and the following steps illustrated in FIG. 5.

The print server 10 according to the present embodiment has a hardware configuration implemented in a general computer and includes a control device such as a central processing unit (CPU), a storage device such as a read only memory (ROM) and a random access memory (RAM), an external storage device such as a hard disk drive (HDD) and/or a compact disc (CD) drive, a display device, and an input device such as a keyboard and/or a mouse.

Program instructions to be executed by the print server 10 of the present embodiment are provided as a computer program product by being recorded in a non-transitory tangible computer-readable recording medium, such as a compact disc read-only memory (CD-ROM), a flexible disk (FD), a compact disc recordable (CD-R), or a digital versatile disk (DVD), in an installable or executable format.

The program instructions to be executed by the print server 10 of the present embodiment may be configured to be stored on a computer connected to a network such as the Internet so that the program instructions are provided by downloading over the network. The program instructions to be executed by the print server 10 of the present embodiment may be configured so as to be provided or distributed via a network such as the Internet. The program instructions to be executed by the print server 10 of the present embodiment may be configured so as to be provided as being installed on a ROM or the like in advance.

The program instructions to be executed by the print server 10 of the present embodiment have a module structure including the above-described units (the communication unit, the rasterization-preference determining unit, the data converting unit, the first-printer-data generating unit, the RIP unit, the second-printer-data generating unit, and the compressing unit). From the viewpoint of actual hardware, the CPU reads out the program instructions from the recording medium and executes the program instructions to load the units on a main storage device, thereby causing the units to be generated on the main storage device.

Figure 6:
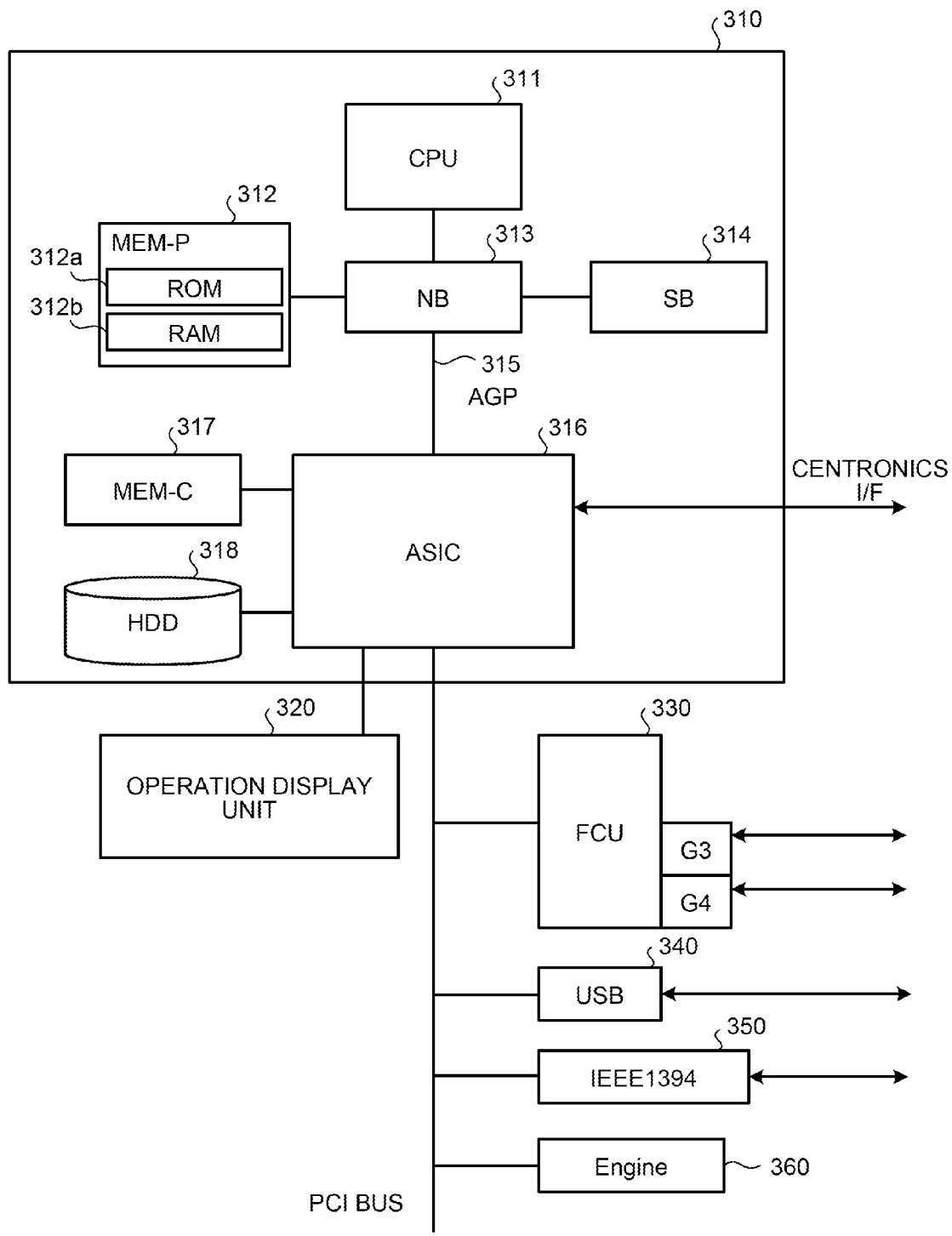
FIG. 6 is a block diagram illustrating a hardware configuration of a multifunction peripheral, which is an implementation example of a printer.

FIG. 6 is a block diagram illustrating a hardware configuration of an MFP as an implementation example of the printer 30 according to the present embodiment. As illustrated in the FIG. 6, the MFP 30 includes a controller 310 and an engine unit (Engine) 360 connected to each other via a peripheral component interface (PCI) bus. The controller 310 controls the entire MFP, rasterization, communication, and inputs entered via an operation unit (not shown). The engine unit 360 is a printer engine or the like connectable to the PCI bus. The engine unit 360 can be, for example, a monochrome plotter, a one-drum color plotter, a four-drum color plotter, a scanner, or a facsimile unit. This engine unit 360 includes, in addition to what is generally referred to as an engine part such as the plotter, a part for image processing, such as error diffusion and gamma conversion.

The controller 310 includes a CPU 311, a north bridge (NB) 313, a system memory (MEM-P) 312, a south bridge (SB) 314, a local memory (MEM-C) 317, an application specific integrated circuit (ASIC) 316, an HDD 318, and an accelerated graphics port (AGP) bus 315. The AGP bus connects between the NB 313 and the ASIC 316. The MEM-P 312 includes a ROM 312a and a RAM 312b.

The CPU 311 controls the entire MFP and includes a chipset made up of the NB 313, the MEM-P 312 and the SB 314. The CPU 311 is connected to other devices via the chipset.

The NB 313 bridges the CPU 311 to the MEM-P 312, the SB 314, and the AGP bus 315, and includes a memory controller that controls writing and reading to and from the MEM-P 312, a PCI master, and an AGP target.

The MEM-P 312 is a system memory for use as a memory for storing program instructions and data, a memory into which program instructions and data are to be loaded, a memory for use in rasterization by the printer, and the like, and includes the ROM 312a and the RAM 312b. The ROM 312a is a read only memory for use as a memory for storing program instructions and data. The RAM 312b is a writable and readable memory for use as a memory into which program instructions and data are to be loaded, as a memory for use in rasterization by the printer, and the like.

The SB 314 bridges the NB 313 to a PCI device and a peripheral device. This SB 314 is connected to the NB 313 via the PCI bus, to which a network interface (I/F) unit and the like are also connected.

The ASIC 316 is an integrated circuit (IC) for image processing application having hardware elements for image processing. The ASIC 316 serves as a bridge that connects the AGP bus 315, the PCI bus, the HDD 318, and the MEM-C 317 to each other. This ASIC 316 includes a PCI target and an AGP master, an arbiter (ARB) serving as the core of the ASIC 316, a memory controller that controls the MEM-C 317, a plurality of direct memory access controllers (DMACs) that perform rotation of image data and the like by hardware logic or the like, a PCI unit that performs data transfer to and from the engine unit 360 via the PCI bus. To the ASIC 316 connected are an facsimile control unit (ECU) 330, a universal serial bus (USB) 340, and an IEEE 1394 (the Institute of Electrical and Electronics Engineers 1394) I/F 350. An operation display unit 320 is directly connected to the ASIC 316.

The MEM-C 317 is a local memory for use as a copy-image buffer and a code buffer. The HDD 318 is a storage for storing image data, program instructions, font data, and forms.

The AGP bus 315 is a bus interface for a graphics accelerator card introduced to speed up graphics operations and allows direct access to the MEM-P 312 with a high throughput, thereby speeding up operations related to the graphic accelerator card.

According to an aspect of the embodiment, it is possible to perform printing reliably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print server connected to a plurality of image forming apparatuses via a network, the print server comprising:
   a print-command acquisition unit configured to acquire a print command containing designation of one of the image forming apparatuses as a printing-assigned apparatus, to which printing is assigned, and designation of to-be-printed data;
   a determining unit configured to,
      determine whether or not the printing-assigned apparatus is defined in advance as a speed-oriented apparatus, the speed-oriented apparatus being an image forming apparatus that is to put a high priority on processing speed, and
      determine whether or not the printing-assigned apparatus is defined in advance as a decompression-capable apparatus, the decompression-capable apparatus being an image forming apparatus capable of decompressing compressed data;

a raster image processing unit configured to, when the printing-assigned apparatus is not the speed-oriented apparatus, obtain rasterized data by performing raster image processing on the to-be-printed data designated in the print command and written in a page description language;

a compressing unit configured to compress data based on whether or not the determining unit determines the printing-assigned apparatus is defined in advance as a decompression-capable apparatus; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data, wherein, the print server is configured such that,
when the printing-assigned apparatus is the decompression-capable apparatus but is not the speed-oriented apparatus, the compressing unit compresses the rasterized data, whereas when the printing-assigned apparatus is the decompression-capable apparatus and also is the speed-oriented apparatus, the compressing unit compresses the to-be-printed data.

2. The print server according to claim 1, wherein, the print server is further configured such that,
when the printing-assigned apparatus is the decompression-capable apparatus but is not the speed-oriented apparatus, the transmitting unit transmits the compressed rasterized data to the printing-assigned apparatus, whereas when the printing-assigned apparatus is the decompression-capable apparatus and also is the speed-oriented apparatus, the transmitting unit transmits the compressed to-be-printed data to the printing-assigned apparatus.

3. A printing system including a plurality of image forming apparatuses and a print server connected to the plurality of image forming apparatuses via a network, the printing system comprising:

a print-command acquisition unit configured to acquire a print command containing designation of one of the image forming apparatuses as a printing-assigned apparatus, to which printing is assigned, and designation of to-be-printed data;

a determining unit configured to,
determine whether or not the printing-assigned apparatus is defined in advance as a speed-oriented apparatus, the speed-oriented apparatus being an image forming apparatus that is to put a high priority on processing speed, and
determine whether or not the printing-assigned apparatus is defined in advance as a decompression-capable apparatus, the decompression-capable apparatus being an image forming apparatus capable of decompressing compressed data;

a raster image processing unit configured to, when the printing-assigned apparatus is not the speed-oriented apparatus, obtain rasterized data by performing raster image processing on the to-be-printed data designated in the print command and written in a page description language;

a compressing unit configured to compress data based on whether or not the determining unit determines the printing-assigned apparatus is defined in advance as a decompression-capable apparatus; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data, wherein, the printing system is configured such that:
when the printing-assigned apparatus is the decompression-capable apparatus but is not the speed-oriented apparatus, the compressing unit compresses the rasterized data, whereas when the printing-assigned apparatus is the decompression-capable apparatus and also is the speed-oriented apparatus, the compressing unit compresses the to-be-printed data.

4. The printing system according to claim 3, wherein, the printing system is further configured such that:
when the printing-assigned apparatus is the decompression-capable apparatus but is not the speed-oriented apparatus, the transmitting unit transmits the compressed rasterized data to the printing-assigned apparatus, whereas when the printing-assigned apparatus is the decompression-capable apparatus and also is the speed-oriented apparatus, the transmitting unit transmits the compressed to-be-printed data to the printing-assigned apparatus.

5. A computer program product comprising a non-transitory computer-readable medium that contains a computer program having instructions that, when executed by a computer connected to a plurality of image forming apparatuses via a network and including a storage unit that stores a speed-oriented apparatus that is to put a high priority on processing speed, cause the computer to function as:

a print-command acquisition unit configured to acquire a print command containing designation of one of the image forming apparatuses as a printing-assigned apparatus, to which printing is assigned, and designation of to-be-printed data;

a determining unit configured to,
determine whether or not the printing-assigned apparatus is defined in advance as the speed-oriented apparatus, and
determine whether or not the printing-assigned apparatus is defined in advance as a decompression-capable apparatus;

a raster image processing unit configured to, when the printing-assigned apparatus is not the speed-oriented apparatus, obtain rasterized data by performing raster image processing on the to-be-printed data designated in the print command and written in a page description language;

a compressing unit configured to compress data based on whether or not the determining unit determines the printing-assigned apparatus is defined in advance as a decompression-capable apparatus; and a transmitting unit configured to transmit any one of the rasterized data and the to-be-printed data to the printing-assigned apparatus in such a manner that when the printing-assigned apparatus is not the speed-oriented apparatus, the transmitting unit transmits the rasterized data, whereas when the printing-assigned apparatus is the speed-oriented apparatus, the transmitting unit transmits the to-be-printed data, wherein the computer program includes further instructions that, when executed by the computer, cause the computer to function such that, when the printing-assigned apparatus is the decompression-capable apparatus but is not the speed-oriented apparatus, the compressing unit compresses the rasterized data, whereas when the printing-assigned apparatus is the decompression-capable apparatus and also is the speed-oriented apparatus, the compressing unit compresses the to-be-printed data.

6. The computer program product according to claim 5, wherein the computer program includes further instructions that, when executed by the computer, cause the computer to function such that, when the printing-assigned apparatus is the decompression-capable apparatus but is not the speed-oriented apparatus, the transmitting unit transmits the compressed rasterized data to the printing-assigned apparatus, whereas when the printing-assigned apparatus is the decompression-capable apparatus and also is the speed-oriented apparatus, the transmitting unit transmits the compressed to-be-printed data to the printing-assigned apparatus.

* * * * *